March 3, 1970  C. VAN DER LELY ET AL  3,498,035
COMBINE HARVESTERS
Filed March 8, 1965  2 Sheets-Sheet 1
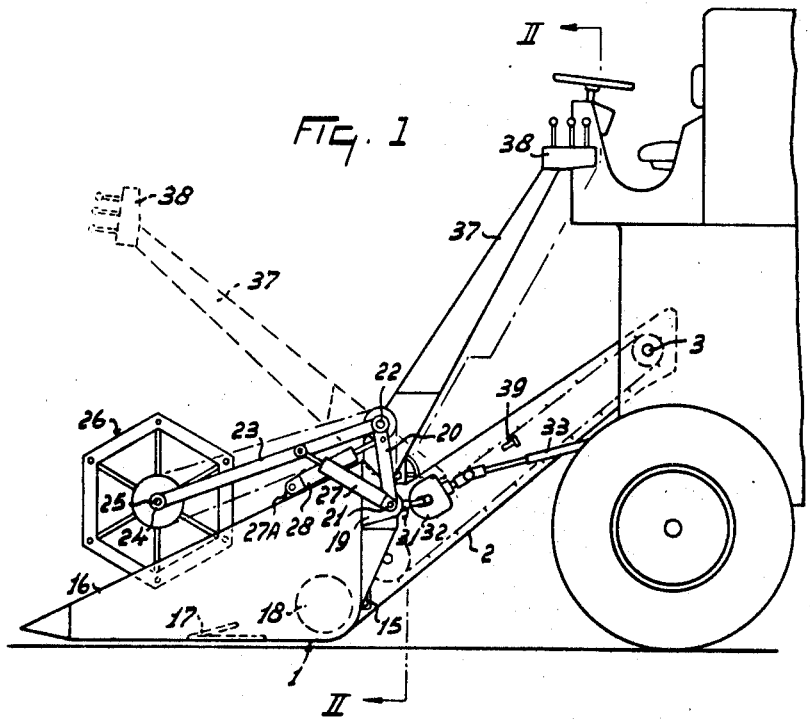
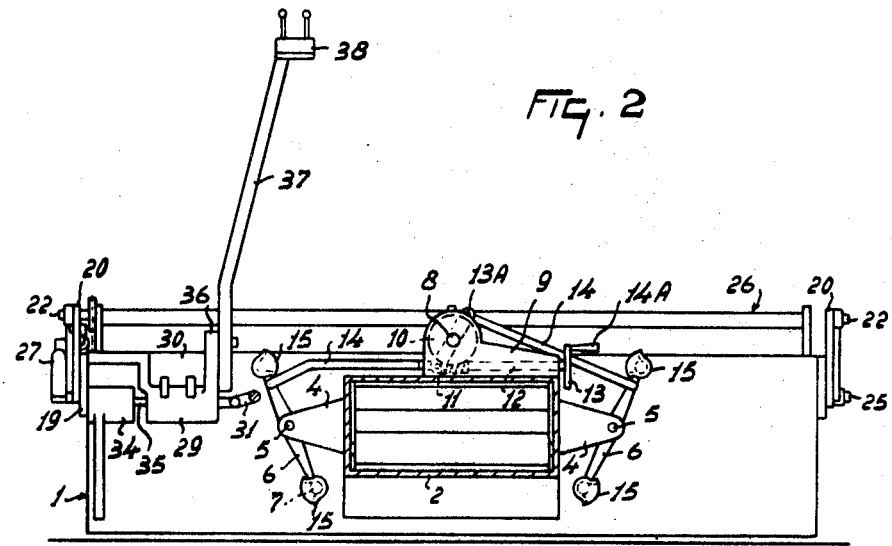
INVENTORS
CORNELIS VAN DER LELY
LEENDERT VAN WINGERDEN
BY
Mason, Mason & Albright
Attorneys

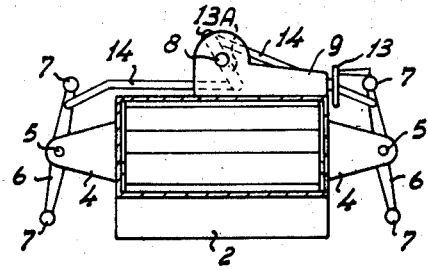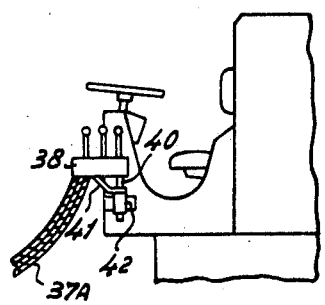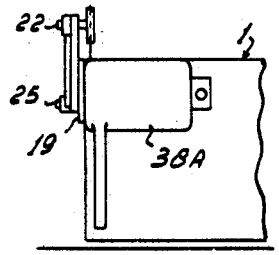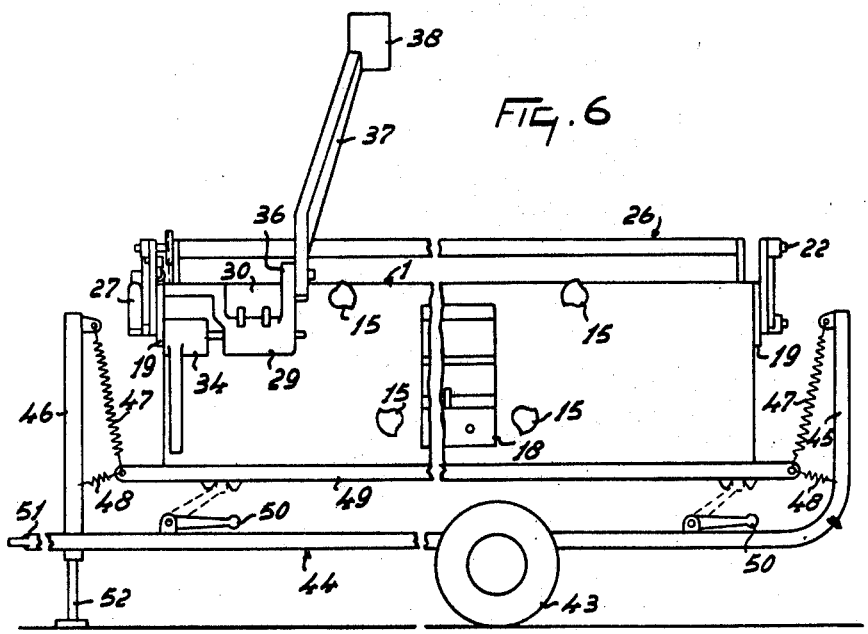

United States Patent Office 3,498,035
Patented Mar. 3, 1970

3,498,035
COMBINE HARVESTERS
Cornelis van der Lely, Zug, Switzerland, Leendert van Wingerden, Dubbeldam, Netherlands, assignors to C. van der Lely N.V., Maasland, Netherlands, a Netherlands limited-liability company
Filed Mar. 8, 1965, Ser. No. 437,694
Claims priority, application Netherlands, Mar. 18, 1964, 6402854
Int. Cl. A01d *35/14*
U.S. Cl. 56—23                                17 Claims

ABSTRACT OF THE DISCLOSURE

In accordance with the invention there is provided a combine harvester having a detachable moving platform, wherein a quick-release mechanism for attaching and detaching the mowing platform is provided, the quick-release mechanism being located between the mowing platform and a front side of the combine harvester.

---

For a better understanding of the invention and to show how the same may be readily carried into effect, reference will now be made, by way of example, to the accompanying drawings in which:

FIG. 1 is a side view of a combine harvester in accordance with the invention,

FIG. 2 is a sectional view taken on the line II—II in FIG. 1,

FIG. 3 is a fragmentary view of part of FIG. 2,

FIG. 4 is a diagrammatic view showing the connection of valves forming part of the hydraulic circuit of the combine harvester, FIG. 5 is a fragmentary view showing diagrammatically an alternative source of power for the hydraulics and the working parts of the combine harvester, and FIG. 6 is a diagrammatic view of a trailer suitable for transporting the mowing platform when disengaged from the combine harvester.

Referring to FIGS. 1 to 5 of the drawings, the combine harvester has a mowing platform 1 mounted at its forward end and arranged on an elevator housing 2. The housing 2 accommodates an elevator for feeding cut crop to a threshing drum. The mowing platform 1 and housing 2 are turnably mounted on the frame of the combine harvester on a horizontal shaft 3 which extends perpendicular to the intended direction of travel. The mowing platform 1 and housing 2 are upwardly and downwardly movable about said shaft 3 by means of a lifting cylinder (not shown) which extends between the frame of the combine harvester and the housing 2. Two supports 4 are mounted near the mouth or opening at the front of the elevator housing 2 and each support 4 carries a horizontal pin 5 which extends parallel to the intended direction of travel. Arms 6 are turnably mounted on the pins 5 and each arm 6 carries two balls or discs 7, one at each opposite end. A shaft 8 is journalled in the wall of a housing 9 arranged on the upper side of the elevator housing 2 and extends parallel to the pins 5 on which the arms 6 are arranged and is located substantially mid-way between said pins 5. The shaft 8 carries a worm pinion 10 mounted inside the housing 9 and co-operating with a worm 11 mounted on a horizontal shaft 12 which extends perpendicular to the intended direction of travel. The shaft 12 is also journalled in a wall of the housing 9 and an end which projects from the housing 9 carries a setting wheel 13 which has a handle 14A fixed thereto. Two arms 13A are fastened to the shaft 8 and extend radially outwardly therefrom in opposite directions. The outer ends of the arms 13A are pivotally connected to rods 14 which, in turn, are pivotally connected to upper end regions of the arms 6. The connections between the rods 14 and the arms 6 are located above the pins 5.

From FIG. 3 it will be evident that, when the setting wheel 13 is turned, the shaft 8 and arms 13A turn in one direction and the arms 6 turn in an opposite direction about their pins 5. The rear wall of the mowing platform 1 has catching jaws 15 mounted thereon, which jaws 15 are so shaped that they can co-operate with the balls or discs 7 mounted on the arms 6. The jaws 15 are hood-shaped and are arranged in pairs, the two jaws in the upper pair being spaced apart from each other by a greater distance than those in the lower pair. The jaws in each pair are located at the same level above the ground but the openings of the upper pair face each other whereas the openings of the lower pair are turned away from each other.

The mowing platform 1 is provided with crop dividers 16, a cutter bar 17 and an auger 18 arranged behind said cutter bar 17. Vertical plate supports 19 are mounted at the rear and near an upper end of the mowing platform 1. Each support 19 has a corresponding arm 20 pivotally connected thereto on a pin 21. The arms 20 extend upwardly from the supports 19 and have beams 23 pivotally connected to their upper ends by means of pins 22. The beams 23 extend generally parallel to the intended direction of travel and carry bearings 24 at their forward ends, which bearings 24 receive a shaft 25 extending perpendicular to the intended direction of travel and supporting a reel 26.

A hydraulic cylinder 27 is arranged between one of the pins 21 and a corresponding beam 23, and a hydraulic cylinder 28 extends between one of the arms 20 corresponding to the pin 21 which has the cylinder 27 associated therewith, and a support 27A fixed to a side wall of the mowing platform 1. The hydraulic cylinder 27 can adjust the height of the reel 26 by causing the beam 23 concerned to turn about its pin 22 and the hydraulic cylinder 28 can cause the reel 26 to move forwardly and backwardly by pivotal movement of the arm 20 concerned. The hydraulic cylinders 27 and 28 form part of a hydraulic circuit which is provided on the mowing platform 1 and which includes an energising mechanism comprising a pump 29 and tank 30 (see FIG. 2). The pump 29 and tank 30 are arranged on the rear side of the mowing platform 1 and are shown in FIG. 2 diagrammatically.

The pump 29 is coupled, through an intermediate shaft 31, a gear box 32 mounted on the elevator housing 2 and a driving shaft 33 extending parallel to the intended direction of travel, with the engine of the combine harvester. A gear box 34 is mounted at the rear side of the mowing platform 1 near the pump 29 and tank 30 and is provided to establish a driving connection (not shown in detail) to the reel 26, the cutter bar 17 and the auger 18. A driving connection to the gear box 34 is obtained by means of a shaft 35 interconnecting the pump 29 and the gear box 34. The pump 29, the tank 30 and the cylinders 27 and 28 communicate with each other through hydraulic pipes (not shown). A support 36 is arranged on the upper side of the rear wall of the mowing platform 1 and an arm 37 is pivotally connected to said support 36 and extends up to the driver's seat on the combine harvester. The arm 37 can be locked in its position adjacent the driver's seat and carries at its upper end valves 38 which communicate through pipes 37A (FIG. 4) with the hydraulic circuit on the mowing platform 1 for actuating the cylinders 27 and 28. However, it will be evident that pneumatic actuation could be provided as an alternative.

FIG. 5 shows diagrammatically an arrangement whereby power can be supplied to the hydraulic system and to the cutting and gathering mechanisms of the mowing platform independently of the combine harvester engine. An internal combustion engine or electric motor 38A is provided on the rear side of the mowing platform 1 and serves as an independent source of power. The engine or motor 38A may be used to provide all the power requirements of the hydraulic system and the cutting and gathering mechanisms though, of course, it may be arranged that power is derived from the engine of the combine harvester to drive some of these mechanisms. The mowing platform 1 can be attached and detached relatively easily from the combine harvester by means of the quick-release mechanism described with reference to FIGS. 2 and 3 and comprising the pins 5, arms 6, discs or balls 7, rods 14, shaft 8, arms 13A, gear wheel 10, worm 11, shaft 12, setting wheel 13 and handle 14A. When drive to the mowing platform is obtained from the engine of the combine harvester then, of course, this must also be disconnected when the mowing platform is detached.

The construction described is of particular importance for combine harvesters having relatively large cutting widths, for example 5 to 6 meters. It is often the case that such combine harvesters are not allowed to be driven along public roads without suitable precautions being taken. With the construction described the mowing platform can be disconnected from the combine harvester without the need for hydraulic pipes extending between the platform and the frame of the combine harvester to be disconnected. In order to disconnect the mowing platform 1 the intermediate shaft 31 is uncoupled from its connection with the pump 29 and the arms 6 are pivoted about their pins 5 by turning of the setting wheel 13, the position of the arms 6 being shown in an uncoupled state in FIG. 3. In this case the axes of the arms intersect each other at a point lying above the mowing platform whereas in the coupled state the axes of the arms 6 intersect each other below the mowing platform and the discs 7 are located in their corresponding jaws 15. When the mowing platform has been disconnected the intermediate shaft 31 can be accommodated in a bracket 39 mounted on the elevator housing 2.

The arm 37 on which the valves 38 are mounted can be pivoted, for transport purposes, into a position as shown in FIG. 1 in broken lines in which the arm is located over and above the mowing platform. In order to fix the arm 37 in either of its two positions, a locking member is provided which, however, is not shown for the sake of clarity.

FIG. 4 is a diagrammatic view showing a detachable connection of the valves 38 to the frame near the driver's seat. A shaft 40 is connected to the housing of the valves 38 and a stop 41 is secured to the shaft. The shaft 40 is rotatably mounted in a bearing 42 placed near the driver's seat. With the construction shown in FIG. 4 the arm 37 may be dispensed with. When the mowing platform is disconnected, the valves 38 are removed from their mounting in the bearing 42 and are transported with the pipes 37A onto the mowing platform.

A trailer may be used to transport the mowing platform when it is disconnected from the combine harvester, the trailer being capable of being hitched to the rear of the combine harvester. The trailer illustrated in FIGURE 6 comprises a frame 44 supported by ground wheels 43 and having vertical beams 45 and 46 mounted at the rear and front respectively. A floor 49 is suspended from the beams 45 and 46 by tension springs 47 and stabilizing springs 48 extend approximately horizontally between the floor and the beams 45 and 46. Adjustable and fixable arms 50 are mounted on the frame 44 and can support the floor 49 during transport (see the broken lines). A draw bar 51 is mounted at the forward end of the trailer and a supporting foot 52 is provided to support the trailer when it is not coupled to a tractor or combine harvester or other propelling vehicle. The spring mounting of the floor of the trailer assists in the connecting and disconnecting of the mowing platform to the combine harvester.

What we claim is:

1. A combine harvester having an elevator housing means and a detachable mowing platform means, said platform means being detachably mounted on the forward end of said elevator housing means with a quick-release mechanism, said quick-release mechanism comprising fastening members associated with one of said means at one end thereof and receiving means for said fastening members mounted on the other of said means, said fastening members comprising at least two spaced arms pivotally mounted on pins disposed on one said means and for transverse movement relative to the direction of travel to be received by said receiving means, whereby said fastening members can be quickly brought into and out of connection with said receiving means.

2. A combine harvester as claimed in claim 1, wherein said arms are each coupled to a rod which is associated with a crank, whereby operation of said crank displaces the rods and said arms are turned about said pins in opposite directions.

3. A combine harvester as claimed in claim 1, wherein said pins extend substantially parallel to each other.

4. A combine harvester as claimed in claim 1, wherein said pins extend substantially horizontal and parallel to the direction of travel.

5. A combine harvester as claimed in claim 4, wherein said arms are coupled with shaft means and said shaft means extends substantially parallel to said pins.

6. A combine harvester as claimed in claim 5, wherein said shaft means is mounted between said arms.

7. A combine harvester as claimed in claim 5, wherein said arms are pivotally connected to said shaft means by rods, said rods extending between said shaft means and the upper portions of said arms, said rods being pivotally connected to further arms extending radially outwardly from said shaft means in opposite directions.

8. A combine harvester as claimed in claim 5, wherein said shaft means is turnable by a worm and gear wheel arrangement associated with said shaft means.

9. A combine harvester as claimed in claim 1, wherein said arms occupy a position in which their axes intersect each other below said mowing platform.

10. A combine harvester as claimed in claim 1, wherein said arms carry discs at their opposite ends and said discs are received in said receiving means to couple said platform means with said housing means.

11. A combine harvester as claimed in claim 1, wherein said arms are mounted at the front of said housing means, one on either side thereof.

12. A combine harvester as claimed in claim 1, wherein the mowing platform has moving parts, an energizing mechanism is on said mowing platform for operating the moving parts of said platform whereby said quick-release mechanism affords the sole coupling between the mowing platform means and elevator housing means and said platform means can be readily detached for transport.

13. A combine harvester as claimed in claim 12, wherein a hydraulic circuit actuates said movable parts of said platform means and said energizing mechanism is mounted on said mowing platform means adjacent a hydraulic pump for pumping fluid in said circuit.

14. A combine harvester as claimed in claim 13, wherein said pump and hydraulic circuit are mounted on said platform means.

15. A combine harvester as claimed in claim 13, wherein valve members for controlling said hydraulic circuit are detachably mounted adjacent a driver's seat on said harvester.

16. A combine harvester as claimed in claim 15, wherein a control arm is connected to said mowing platform and said control arm extends up to the proximity of the driver's seat, said arm housing said valve members.

17. A combine harvester as claimed in claim 16, wherein said control arm carrying said valve member is turnably mounted on rod means which extends transversely of the direction of travel, said control arm being fixable in more than one position substantially over and above said mowing platform.

References Cited

UNITED STATES PATENTS

| | | | |
|---|---|---|---|
| 2,488,698 | 11/1949 | Acton | 56—20 |
| 2,599,366 | 6/1952 | Bohnenblust | 56—228 XR |
| 2,766,572 | 10/1956 | Vogelaar | 56—21 |
| 2,842,925 | 7/1958 | Allen | 56—21 |
| 2,867,958 | 1/1959 | Allen | 56—21 |
| 3,233,394 | 2/1966 | Lundell | 56—24 XR |
| 3,270,489 | 9/1966 | Rohweder | 56—21 |

ANTONIO F. GUIDA, Primary Examiner

U.S. Cl. X.R.

56—2, 228